United States Patent
Mu

(10) Patent No.: US 12,532,225 B2
(45) Date of Patent: Jan. 20, 2026

(54) CHANNEL PARAMETER DETERMINATION METHOD AND APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 416 days.

(21) Appl. No.: 18/013,465

(22) PCT Filed: Jul. 28, 2020

(86) PCT No.: PCT/CN2020/105252
§ 371 (c)(1),
(2) Date: Dec. 28, 2022

(87) PCT Pub. No.: WO2022/021079
PCT Pub. Date: Feb. 3, 2022

(65) Prior Publication Data
US 2023/0262527 A1    Aug. 17, 2023

(51) Int. Cl.
*H04W 28/18* (2009.01)
(52) U.S. Cl.
CPC ................... *H04W 28/18* (2013.01)
(58) Field of Classification Search
CPC ....... H04W 28/18; G06N 3/084; H04L 5/006; H04L 5/0053; Y02D 30/70
See application file for complete search history.

(56) References Cited

U.S. PATENT DOCUMENTS

| | | | |
|---|---|---|---|
| 2015/0333854 A1 | 11/2015 | Yang | |
| 2017/0047964 A1* | 2/2017 | Liu | H04W 56/0015 |
| 2018/0160410 A1* | 6/2018 | Xia | H04W 72/0446 |
| 2019/0253308 A1 | 8/2019 | Huang et al. | |
| 2021/0143931 A1* | 5/2021 | Sandberg | H04L 1/0009 |

FOREIGN PATENT DOCUMENTS

| | | |
|---|---|---|
| CN | 103369582 A | 10/2013 |
| CN | 104734809 A | 6/2015 |
| CN | 105392154 A | 3/2016 |
| CN | 105991218 A | 10/2016 |
| CN | 109862619 A | 6/2019 |
| CN | 110661734 A | 1/2020 |
| CN | 110677911 A | 1/2020 |
| CN | 111132190 A | 5/2020 |
| CN | 111356232 A | 6/2020 |

(Continued)

OTHER PUBLICATIONS

LG Electronics. "3GPP TSG RAN WG1 Meeting # R1-113192" On the Necessity of an Enhanced PDCCH in Rel-11, Oct. 14, 2011 (Oct. 14, 2011), entire document; Type-A. 4 pages.

*Primary Examiner* — Nizam U Ahmed
(74) *Attorney, Agent, or Firm* — Volpe Koenig

(57) ABSTRACT

A channel parameter determination method, apparatus and computer readable medium that improve efficiency of a network device in a communication network. The efficiency of the network device is improved by obtaining a first parameter; and, determining a second parameter of a channel by using at least one channel parameter model based on the first parameter.

18 Claims, 7 Drawing Sheets

(56) References Cited

FOREIGN PATENT DOCUMENTS

| JP | 2011155511 A | 8/2011 |
|---|---|---|
| WO | 2006106474 A1 | 10/2006 |
| WO | 2018231110 A1 | 12/2018 |
| WO | 2019196828 A1 | 10/2019 |
| WO | 2020121020 A1 | 6/2020 |

* cited by examiner

CHANNEL PARAMETER DETERMINATION METHOD AND APPARATUS, AND STORAGE MEDIUM

CROSS-REFERENCE TO RELATED APPLICATION

The present application is a U.S. National Stage of International Application No. PCT/CN2020/105252, filed on Jul. 28, 2020, the entire content of which is incorporated herein by reference for all purposes.

BACKGROUND

A physical downlink control channel (PDCCH) is a channel used to carry downlink control information (DCI). The DCI sent by a base station to user equipment (UE) through the PDCCH may be used to schedule the UE.

SUMMARY

The disclosure relates to the technical field of wireless communications, in particular to a channel parameter determination method and apparatus, and a storage medium.

According to a first aspect of an example of the disclosure, there is provided a channel parameter determination method, and performed by a network device. The method includes: obtaining a first parameter; and determining a second parameter of a channel by using at least one channel parameter model based on the first parameter.

According to a second aspect of an example of the disclosure, there is provided a channel parameter determination method, and performed by a terminal. The method includes: obtaining a first parameter; and determining a second parameter of a channel by using at least one channel parameter model based on the first parameter.

According to a third aspect of an example of the disclosure, there is provided a channel parameter determination apparatus, and performed by a network device. The apparatus includes: a processor; and a memory for storing executable instructions of the processor, where the processor is configured to: obtain a first parameter; and determine a second parameter of a channel by using at least one channel parameter model based on the first parameter.

According to a fourth aspect of an example of the disclosure, there is provided a non-transitory computer readable storage medium. Instructions in the storage medium, in response to being executed by a processor, cause the processor to be capable of executing the channel parameter determination method provided by any technical solution of the aforementioned first aspect.

According to a fifth aspect of an example of the disclosure, there is provided a channel parameter determination apparatus, and performed by a terminal. The apparatus includes: a processor; and a memory for storing executable instructions of the processor, where the processor is configured to: execute the channel parameter determination method provided by any technical solution of the aforementioned second aspect.

According to a sixth aspect of an example of the disclosure, there is provided a non-transitory computer readable storage medium. Instructions in the storage medium, in response to being executed by a processor, cause the processor to be capable of executing the channel parameter determination method provided by any technical solution of the aforementioned second aspect.

It should be understood that the above general description and the following detailed description are illustrative and explanatory, and cannot limit the disclosure.

BRIEF DESCRIPTION OF THE DRAWINGS

Accompanying drawings here, which are incorporated in and constitute a part of this specification, illustrate examples consistent with the disclosure and serve to explain the principles of the disclosure together with the specification.

DETAILED DESCRIPTION

Examples will be illustrated in detail here, and instances of which are represented in accompanying drawings. In response to determining that the following description refers to the accompanying drawings, the same number in the different accompanying drawings represents the same or similar elements unless otherwise indicated. The implementations described in the following examples do not represent all implementations consistent with the disclosure. On the contrary, they are examples of an apparatus and method consistent with some aspects of the disclosure as detailed in the appended claims.

Figure 1:
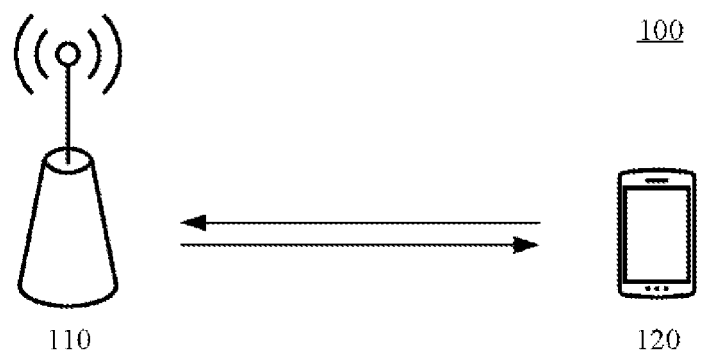
FIG. 1 is a schematic diagram of a wireless communication system shown according to an example.

A channel parameter determination method provided by an example of the disclosure may be performed by a wireless communication system shown in FIG. 1. Referring to FIG. 1, the wireless communication system 100 includes a network device 110 and a terminal 120. The network device 110 and the terminal 120 send and receive information through a wireless resource.

It may be understood that the wireless communication system shown in FIG. 1 is a schematic illustration. The wireless communication system may further include other network devices, for example, may further include a core network device, a wireless relay device, a wireless backhaul device, etc., which is not drawn in FIG. 1. The example of the disclosure does not limit the quantity of the network device and the quantity of the terminal included in the wireless communication system.

It may be further understood that the wireless communication system, according to the example of the disclosure, is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (single carrier FDMA, SC-FDMA), and carrier sense multiple access with collision avoidance (CSMA/CA). The network may be divided into a 2G (generation) network, a 3G network, a 4G network, or a future evolution network, such as a 5G network according to capacity, speed, delay, and other factors of the different networks. The 5G network may also be called a 5G new radio. For the convenience of description, the disclosure sometimes refers to the wireless communication network simply as the network.

Further, the network device involved in the disclosure may also be called a wireless access network device. The wireless access network device may be: a base station, an evolved nodeB (eNodeB or eNB), a femto, an access point (AP) in a wireless fidelity (WIFI) system, a wireless relay node, a wireless backhaul node, a transmission point (TP), or a transmission and reception point (TRP), etc., may further be a base station (gNodeB or gNB) in an NR system, or may further be a component or part of a device that constitutes the base station. It should be understood that a specific technology and a specific device form employed by the network device are not limited to the example of the disclosure. In the disclosure, the network device may provide communication coverage for a specific geographic region, and may communicate with a terminal located within a coverage region (cell). In addition, in response to determining that it is a vehicle-to-everything (V2X) communication system, the network device may further be a vehicle-mounted device.

Further, the terminal involved in the disclosure may also be called a terminal device, user equipment (UE), a mobile station (MS), a mobile terminal (MT), etc., and is a device that provides voice and/or data connectivity to a user. For example, the terminal may be a handheld device and the vehicle-mounted device with a wireless connection function. At present, some examples of the terminal are: a smart phone, a pocket personal computer (PPC), a palm computer, a personal digital assistant (PDA), a notebook computer, a tablet computer, a wearable device, or the vehicle-mounted device, etc. In addition, in response to determining that it is the vehicle-to-everything (V2X) communication system, the terminal device may further be the vehicle-mounted device. It should be understood that the specific technology and the specific device form employed by the terminal are not limited to the example of the disclosure.

A basic component unit of a PDCCH in an NR is a resource element group (REG). One REG corresponds to a size (twelve REs) of one PRB in a frequency domain and corresponds to a size of one orthogonal frequency division multiplexing (OFDM) symbol in a time domain. The six REGs will form one control channel element (CCE). The CCE is a component unit of a search space of the terminal during blind detection. In the current NR system, one PDCCH may be composed of one, two, four, eight, or sixteen CCEs. The number of CCEs contained in one PDCCH is called an aggregation degree. In response to determining that an information bit of one PDCCH is fixed, its aggregation degree is mainly determined by a channel condition. In response to determining that the channel condition of the terminal is good, a smaller aggregation degree may be used. In response to determining that the channel condition is poor, a greater aggregation degree is selected. In addition, for a PDCCH with the different aggregation degrees, a protocol supports a plurality of candidate transmission locations. For example, for a PDCCH with CCE-4, there may be two candidate transmission locations. The base station and the terminal may calculate CCE numbers of these two candidate locations in a configured control resource set according to a preset rule, for example, CCE #0-CCE #3, and CCE #4-CCE #7. Since the terminal has multiple transmission demands, the terminal may monitor a plurality of DCI formats. Hence, the terminal will further try two DCI sizes during detection. The following table schematically shows the possibility that one terminal needs blind detection. For example, the terminal will first try an aggregation degree 1, will successively detect the corresponding six candidate transmission locations based on the aggregation degree 1, and will try two possible DCI sizes, namely, a DCI size 1 and a DCI size 2 at each candidate transmission location. For example, the terminal then tries an aggregation degree 2, will successively detect the corresponding six candidate transmission locations based on the aggregation degree 2, and will try two possible DCI sizes at each candidate transmission location. Similarly, the terminal then tries aggregate degrees 4 and 8 in turn to traverse all the possibilities.

| CCE aggregation degree | Candidate transmission location | Possible DCI size |
| --- | --- | --- |
| 1 | CCE#1, CCE#2, . . . CCE#6 | DCI size 1, DCI size 2 |
| 2 | CCE#1-CCE#2, CCE#3-CCE#4, CCE#5-CCE#6, CCE#7-CCE#8, CCE#9-CCE#10, CCE#11-CCE#12 | DCI size 1, DCI size 2 |
| 4 | CCE#1-CCE#4, CCE#5-CCE#8 | DCI size 1, DCI size 2 |
| 8 | CCE#1-CCE#8, CCE#9-CCE#16 | DCI size 1, DCI size 2 |

As described above, a terminal side needs to detect the PDCCH, but the terminal cannot judge what aggregation degree the base station will use and which PDCCH candidate transmission location it will use for transmission. Hence, the terminal can merely traverse all possibilities, which brings a lot of power consumption.

In recent years, artificial intelligence (AI), especially a machine learning technology, has developed rapidly. Artificial intelligence technology is good at discovering inherent features and connections in data, generating a corresponding model, and making corresponding predictions and adjustments based on the model. It's shown that self-learning, self-optimization, and self-decision-making characteristics are also favored by more and more industries.

An inventor realized that a current AI regression algorithm can form a corresponding model based on data training and has a good prediction function. In the field of terminal energy conservation, potential features and inherent connections of various service data and terminal data can be excavated through artificial intelligence technology. In view of this, the inventor proposes to introduce the prediction function of the AI to the terminal to predict the aggregation degree and transmission location of PDCCH transmission, thus providing guidance for PDCCH detection of the terminal. That is, a PDCCH transmission model is established through machine learning, and the transmission of the PDCCH can be predicted according to the model to guide blind detection of the terminal side. A channel parameter is predicted to guide the terminal to perform blind detection, thus optimizing a transmission flow and reducing power overheads.

To overcome the problem existing in the related art, the disclosure provides a channel parameter determination method and apparatus, and a storage medium.

Figure 2:
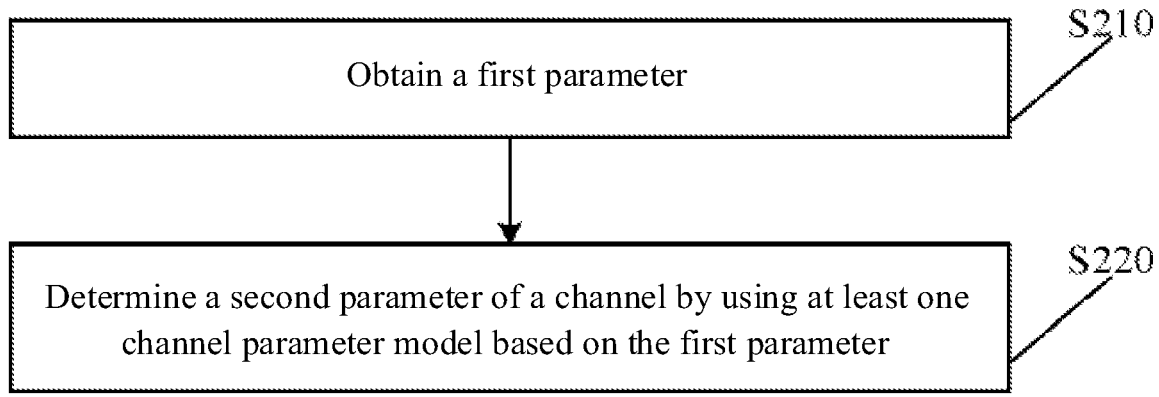
FIG. 2 is a flow diagram of a channel parameter determination method shown according to an example.

An example of the disclosure provides a channel parameter determination method, performed by a network device. FIG. 2 is a flow diagram of a channel parameter determination method shown according to an example. Referring to FIG. 2, the channel parameter determination method is performed by a network device, and includes the following step S210 and step S220.

In step S210, a first parameter is obtained.

In step S220, a second parameter of a channel is determined by using at least one channel parameter model based on the first parameter.

By the disclosure, a channel parameter can be predicted to guide the terminal to perform blind detection, thus optimizing a transmission flow and reducing power overheads.

In some examples, the channel parameter model is a channel parameter model based on a regression algorithm. For example, in the channel parameter model of the regression algorithm, prediction is performed according to an association relationship between an independent variable and a dependent variable. The number of the independent variables may be one or more, according to the number of the independent variables, it may be divided into simple regression prediction and multivariable regression prediction. At the same time, according to the association relationship between the independent variable and the dependent variable, it is divided into a linear regression prediction method and a non-linear regression prediction method.

It should be pointed out that the channel parameter model of the example of the disclosure is not limited to the channel parameter model based on the regression algorithm, and may employ other types of models. In some examples, the channel parameter model may employ a trend extrapolation prediction model. In the trend extrapolation prediction model, according to historical and realistic data of an event, rules of the development and change of things over time are sought to predict a future situation of the event. In some examples, the channel parameter model may employ a Kalman filter prediction model. In the Kalman filter prediction model, a minimum mean square error is taken as the best criterion for estimation, so a set of recursive estimation models is sought. In some examples, the channel parameter model may employ a combined prediction model. In the combined prediction model, a plurality of prediction methods are employed for the same event, and information provided by these methods is comprehensively used to improve prediction accuracy as much as possible. In some examples, the channel parameter model may employ a back-propagation (BP) network prediction model. In the BP prediction model, a network weight and threshold are constantly revised through training of sample data to make an error function decline in a negative gradient direction and approach the expected output.

In some examples of the disclosure, the first parameter includes at least one of the following: a service type, a service occurrence time, a terminal moving speed, a terminal channel condition, a terminal receiving capability, or a cell ID. For example, the terminal channel condition includes at least one of the following: a signal to interference plus noise ratio (SINR), or reference signal receiving power (RSRP).

In some examples of the disclosure, the second parameter includes at least one of the following: an aggregation degree of a physical downlink control channel (PDCCH), a transmission location of the PDCCH, or a DCI size of the PDCCH.

According to the example of the disclosure, the second parameter of the channel is determined by using at least one channel parameter model based on the first parameter. The channel parameter model may be a preset channel parameter model or a trained channel parameter model. The second parameter is obtained by inputting the first parameter and using the channel parameter model for inference. The first parameter, for example, may be the service type, the service occurrence time, the terminal moving speed, the terminal channel condition, the terminal receiving capability, or the cell ID. The second parameter, for example, may be the aggregation degree of the physical downlink control channel (PDCCH), the transmission location of the PDCCH, or the DCI size of the PDCCH. In the present example, the first parameter is taken as the input of the channel parameter model during inference, and the second parameter is the output of the channel parameter model during inference.

Based on a prediction result of the inference, the terminal will give priority to detecting the predicted aggregation degree, transmission location, and DCI format. In response to determining that the terminal detects the corresponding DCI, the terminal stops detection. Otherwise, the terminal will continue detection.

Figure 3:
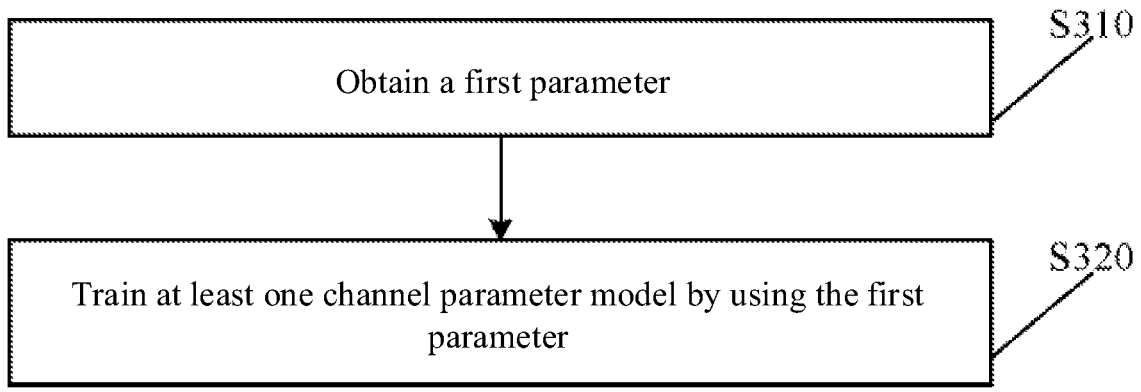
FIG. 3 is a flow diagram of a channel parameter determination method shown according to an example.

Then, the training of the channel parameter model is briefly described. FIG. 3 is a flow diagram of a channel parameter determination method shown according to an example. Referring to FIG. 3, the channel parameter determination method is performed by a network device, and includes the following step S310 and step S320.

In step S310, a first parameter is obtained.

In step S320, at least one channel parameter model is trained by using the first parameter.

In some examples, the channel parameter model may be trained at a network device. In response to determining that the channel parameter model is trained, a feature of input data may include the first parameter, and the first parameter, for example, may be a service type, a service occurrence time, a terminal moving speed, a terminal channel condition, a terminal receiving capability, or a cell ID. A label of output data may be a PDCCH aggregation degree, a transmission location, a DCI size, etc. In response to determining that the channel parameter model is trained, a feature of output data may include a second parameter, and the second parameter, for example, may be the aggregation degree of a physical downlink control channel (PDCCH), the transmission location of the PDCCH, or the DCI size of the PDCCH. In the present example, the first parameter is taken as input of the channel parameter model during training, and the second parameter is output of the channel parameter model during training.

In some examples of the disclosure, training the at least one channel parameter model includes: a second parameter of the channel in at least one time point is output; or the second parameter of the channel in at least one time period is output. For example, output of training data may be a PDCCH transmission situation at a certain time or a PDCCH transmission situation over a period of time.

In some examples of the disclosure, obtaining the first parameter includes: the first parameter of the channel at the plurality of time periods within a day is obtained. For example, one channel parameter model may be trained, or the plurality of channel parameter models may be trained. In an example, for example, according to a habit of the terminal, one channel parameter model is trained in a morning peak period (such as 7:30-9:30), another channel parameter model is trained in a noon period (such as 11:00-13:00), and yet another channel parameter model is trained in an evening peak period (such as 17:00-19:00).

Figure 4:
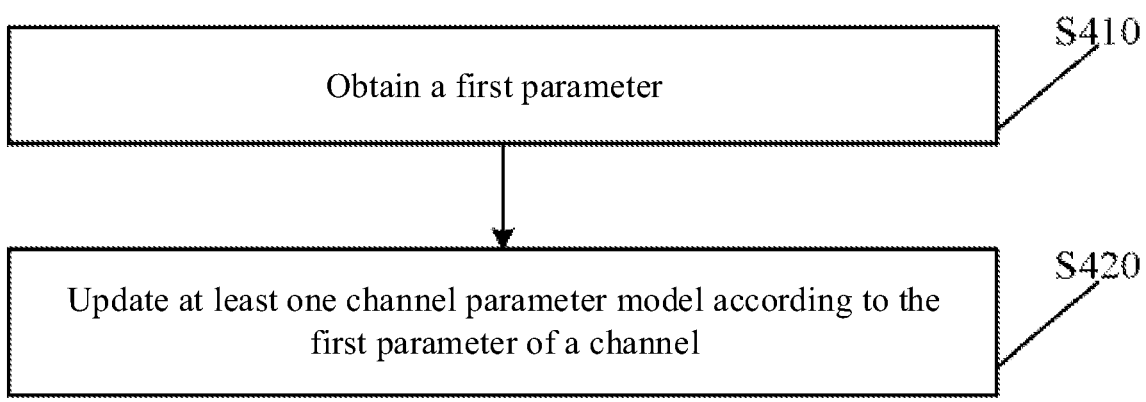
FIG. 4 is a flow diagram of a channel parameter determination method shown according to an example.

Then, updating of the channel parameter model is briefly described. FIG. 4 is a flow diagram of a channel parameter determination method shown according to an example. Referring to FIG. 4, the channel parameter determination method is performed by a network device, and includes the following step S410 and step S420.

In step S410, a first parameter is obtained.

In step S420, at least one channel parameter model is updated according to the first parameter of a channel.

According to the example of the disclosure, the network device may update the model according to newly generated data. After the model on a network device side is updated and a model test is stable, the updated model may be issued to the terminal.

Then, using of the channel parameter model is briefly described. In some examples of the disclosure, the method further includes: the at least one channel parameter model is sent to a terminal. For example, in response to determining that the channel parameter model is located on the network device side, the network device may send the plurality of channel parameter models to the terminal. In response to determining that there is the plurality of channel parameter models, the terminal may download the plurality of models to the local, and the network device indicates which model the terminal uses, or the terminal switches the model according to some trigger conditions.

In some examples of the disclosure, the method further includes: first information is sent, the first information is used to indicate the at least one channel parameter model. In this example, the channel parameter model is specified by sending information or signaling.

In some examples of the disclosure, the method further includes: second information is sent, the second information is used to indicate activation of the at least one channel parameter model or to indicate deactivation of the at least one channel parameter model. For example, the network device may send the signaling to suggest the terminal to use a channel parameter model inference or return back to a traditional method. For example, in response to determining that a conventional moving track or conventional activity site of the terminal changes, the channel parameter model is no longer applicable. In this case, the network device may deactivate the use of the channel parameter model.

According to the example, as described above in the disclosure, a PDCCH transmission model is established through machine learning, and the transmission of the PDCCH can be predicted according to the model to guide blind detection on the terminal side. A channel parameter is predicted to guide the terminal to perform blind detection, thus optimizing a transmission flow and reducing power overheads. Specifically speaking, on the one hand, an optimal parameter configuration model for various services and all terminals can be formed by observing various service data and terminal data features and various power saving parameter settings based on a data-driven machine learning method, and a more refined and personalized power saving solution is provided. On the other hand, adaptive adjustment is made by predicting various service data, terminal data, network status, etc. On yet another hand, a potential connection or model in each communication process established based on machine learning can further improve the relevant flows and reduce the power overheads.

It should be noted that those skilled in the art can understand that the various above-mentioned implementations/examples of the examples of the disclosure can be used in conjunction with the aforementioned examples or independently. Whether to be used alone or in conjunction with the aforementioned examples, its implementation principle is similar. In the example of the disclosure, part of the examples is illustrated through the implementation used together. Certainly, those skilled in the art can understand that such examples do not limit the examples of the disclosure.

Figure 5:
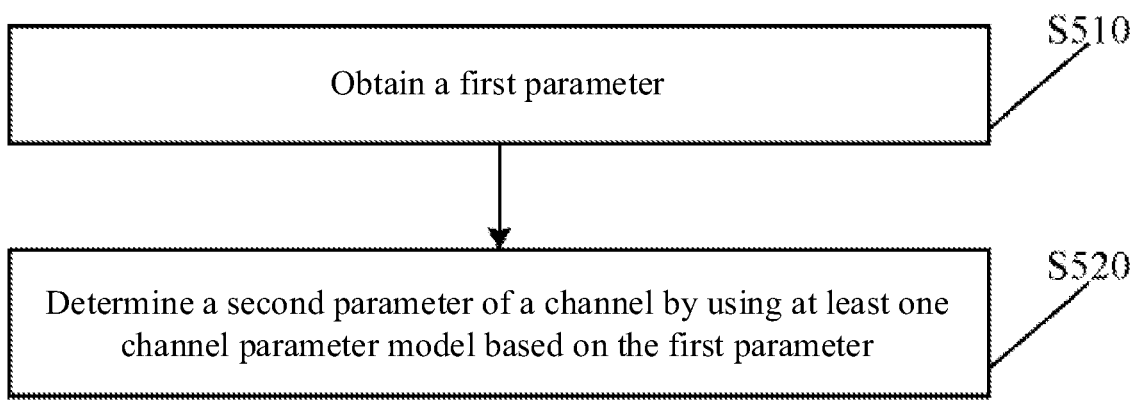
FIG. 5 is a flow diagram of a channel parameter determination method shown according to an example.

An example of the disclosure provides a channel parameter determination method, performed by a terminal. FIG. 5 is a flow diagram of a channel parameter determination method shown according to an example. Referring to FIG. 5, the channel parameter determination method is performed by a terminal, and includes the following step S510 and step S520.

In step S510, a first parameter is obtained.

In step S520, a second parameter of a channel is determined by using at least one channel parameter model based on the first parameter.

In some examples of the disclosure, the channel parameter model is a channel parameter model based on a regression algorithm.

In some examples of the disclosure, the first parameter includes: a service type, a service occurrence time, a terminal moving speed, a terminal channel condition, a terminal receiving capability, or a cell ID. For example, the terminal channel condition includes: a signal to interference plus noise ratio (SINR), or reference signal receiving power (RSRP).

In some examples of the disclosure, the second parameter includes: an aggregation degree of a physical downlink control channel (PDCCH), a transmission location of the PDCCH, or a DCI size of the PDCCH.

Figure 6:
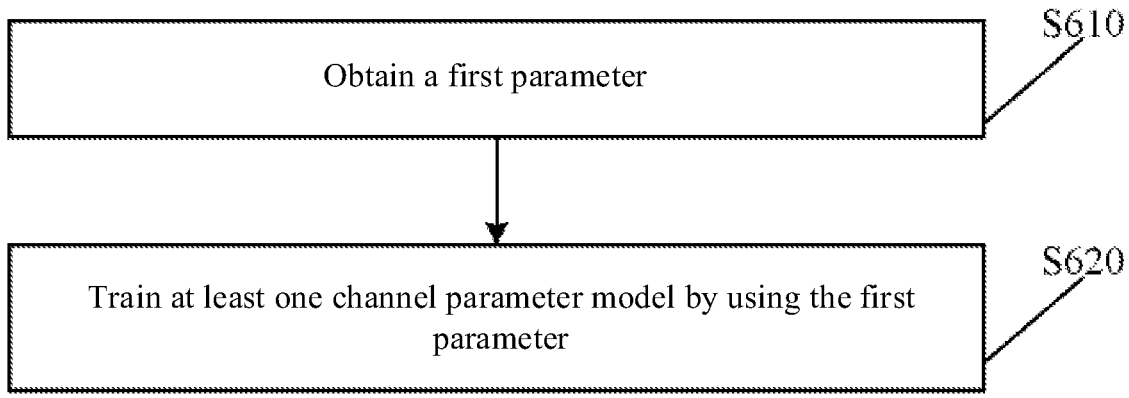
FIG. 6 is a flow diagram of a channel parameter determination method shown according to an example.

FIG. 6 is a flow diagram of a channel parameter determination method shown according to an example. Referring to FIG. 6, the channel parameter determination method is performed by a terminal, and includes the following step S610 and step S620.

In step S610, a first parameter is obtained.

In step S620, at least one channel parameter model is trained by using the first parameter.

In some examples of the disclosure, training the at least one channel parameter model includes: a second parameter of the channel in at least one time point is output; or the second parameter of the channel in at least one time period is output.

In some examples of the disclosure, obtaining the first parameter includes: the first parameter of the channel at the plurality of time periods within a day is obtained.

Figure 7:
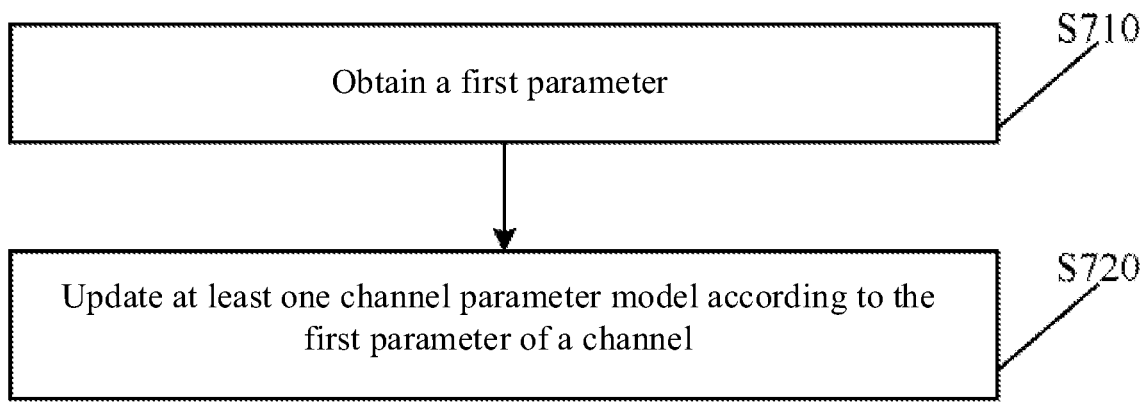
FIG. 7 is a flow diagram of a channel parameter determination method shown according to an example.

FIG. 7 is a flow diagram of a channel parameter determination method shown according to an example. Referring to FIG. 7, the channel parameter determination method is performed by a terminal, and includes the following step S710 and step S720.

In step S710, a first parameter is obtained.

In step S720, at least one channel parameter model is updated according to the first parameter of a channel.

According to the example of the disclosure, the terminal may update the model according to the newly generated data.

In some examples of the disclosure, the method further includes: the at least one channel parameter model sent from a network device is received. For example, the method further includes: the one or more channel parameter models among the at least one channel parameter model are determined according to a received signaling. For example, the method further includes: switching performed among the plurality of channel parameter models according to a trigger condition. According to the example described above, in response to determining that the channel parameter model is located on a network device side, the network device may send the plurality of channel parameter models to the terminal. In response to determining that there is the plurality of channel parameter models, the terminal may download the plurality of models to the local, and the network device indicates which model the terminal uses, or the terminal switches the model according to some trigger conditions.

In some examples of the disclosure, the method further includes: first information is received, the first information is used to indicate the at least one channel parameter model. In this example, by receiving information or signaling sent by the network device, the channel parameter model is specified by the information or signaling.

In some examples of the disclosure, the method further includes: second information is received, the second information is used to indicate activation of the at least one channel parameter model or to indicate deactivation of the at least one channel parameter model. For example, by receiving the signaling sent by the network device, the terminal uses channel parameter model inference or returns back to a traditional method. For example, in response to determining that a conventional moving track or conventional activity site of the terminal changes, the channel parameter model is no longer applicable. In this case, the terminal may return back to the traditional method.

It should be noted that those skilled in the art can understand that the various above-mentioned implementations/examples can be used in conjunction with the aforementioned examples or independently. Whether to be used alone or in conjunction with the aforementioned examples, its implementation principle is similar. In the example of the disclosure, part of the examples is illustrated through the implementation used together. Certainly, those skilled in the art can understand that such examples do not limit the examples.

The followings are the apparatus examples, which may be used to execute the method examples of the disclosure. For details not disclosed in the apparatus examples of the disclosure, please refer to the method examples of the disclosure.

Based on the same concept, an example provides a channel parameter determination apparatus, performed by a network device.

Figure 8:
FIG. 8 is a block diagram of a channel parameter determination apparatus shown according to an example.

FIG. 8 is a block diagram of a channel parameter determination apparatus shown according to an example. Referring to FIG. 8, the channel parameter determination apparatus 800 is performed by the network device, including a parameter obtaining unit 810 and a parameter determining unit 820.

The parameter obtaining unit 810 is configured to obtain a first parameter.

The parameter determining unit 820 is configured to determine a second parameter of a channel by using at least one channel parameter model based on the first parameter.

In some examples, the channel parameter model is a channel parameter model based on a regression algorithm.

In some examples, the first parameter includes: a service type, a service occurrence time, a terminal moving speed, a terminal channel condition, a terminal receiving capability, or a cell ID. For example, the terminal channel condition includes: a signal to interference plus noise ratio (SINR), or reference signal receiving power (RSRP).

In some examples, the second parameter includes: an aggregation degree of a physical downlink control channel (PDCCH), a transmission location of the PDCCH, or a DCI size of the PDCCH.

Figure 9:
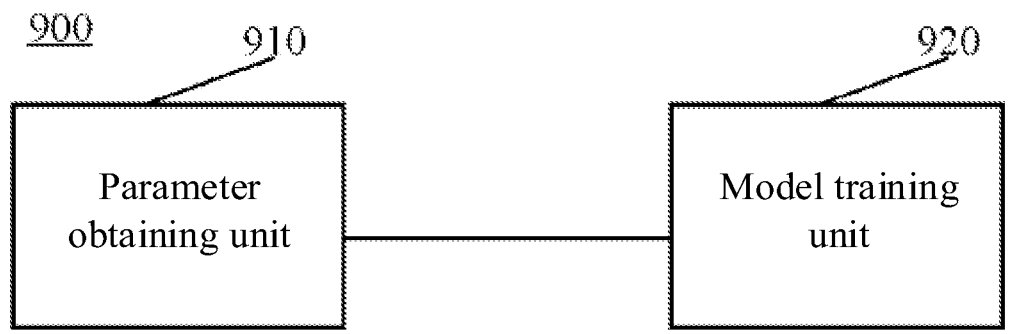
FIG. 9 is a block diagram of a channel parameter determination apparatus shown according to an example.

FIG. 9 is a block diagram of a channel parameter determination apparatus shown according to an example. Referring to FIG. 9, the channel parameter determination apparatus 900 is performed by the network device, including a parameter obtaining unit 910 and a model training unit 920.

The parameter obtaining unit 910 is configured to obtain a first parameter.

The model training unit 920 is configured to train at least one channel parameter model by using the first parameter.

In some examples, the model training unit 920 is configured to output a second parameter of the channel in at least one time point; or output the second parameter of the channel in at least one time period.

In some examples, the parameter obtaining unit 910 is configured to obtain the first parameter of the channel at the plurality of time periods within a day.

Figure 10:
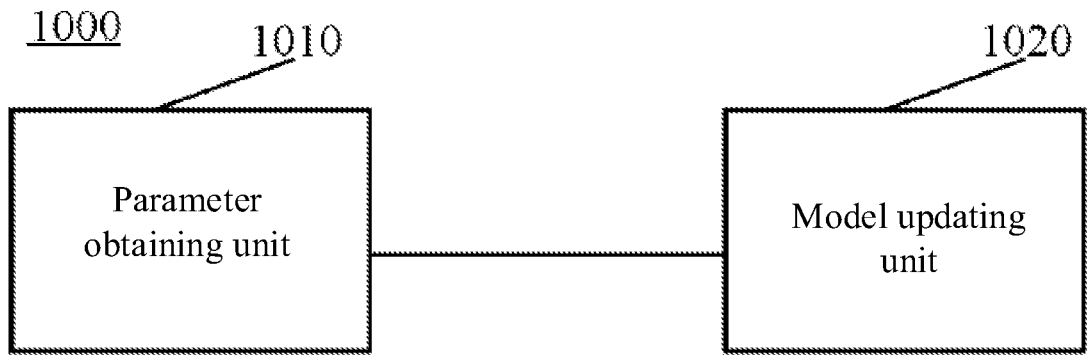
FIG. 10 is a block diagram of a channel parameter determination apparatus shown according to an example.

FIG. 10 is a block diagram of a channel parameter determination apparatus shown according to an example. Referring to FIG. 10, the channel parameter determination apparatus 1000 is performed by a network device, including a parameter obtaining unit 1010 and a model updating unit 1020.

The parameter obtaining unit 1010 is configured to obtain a first parameter.

The model updating unit 1020 is configured to update at least one channel parameter model according to the first parameter of a channel.

The followings are the apparatus examples, which may be used to execute the method examples of the disclosure. For details not disclosed in the apparatus examples of the disclosure, please refer to the method examples of the disclosure.

Based on the same concept, an example of the disclosure provides a channel parameter determination apparatus, performed by a terminal.

Figure 11:
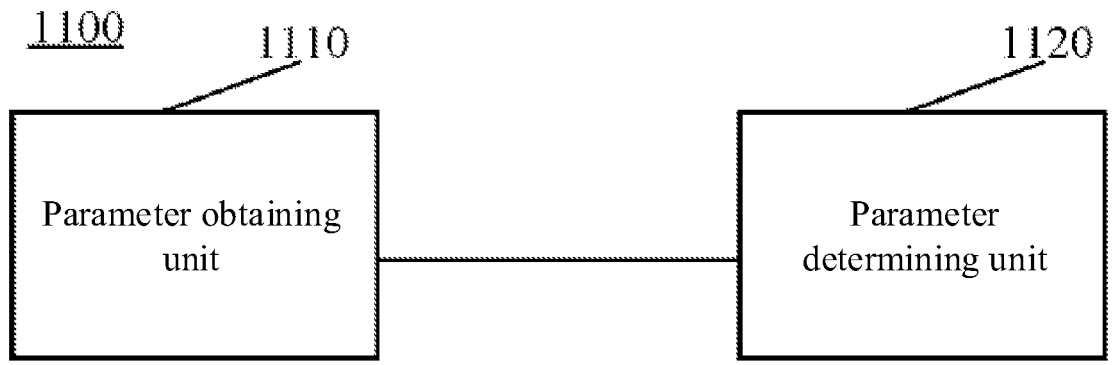
FIG. 11 is a block diagram of a channel parameter determination apparatus shown according to an example.

FIG. 11 is a block diagram of a channel parameter determination apparatus shown according to an example. Referring to FIG. 11, the channel parameter determination apparatus 1100 is performed by the terminal, including a parameter obtaining unit 1110 and a parameter determining unit 1120.

The parameter obtaining unit 1110 is configured to obtain a first parameter.

The parameter determining unit 1120 is configured to determine a second parameter of a channel by using at least one channel parameter model based on the first parameter.

In some examples of the disclosure, the channel parameter model is a channel parameter model based on a regression algorithm.

In some examples of the disclosure, the first parameter includes: a service type, a service occurrence time, a terminal moving speed, a terminal channel condition, a terminal receiving capability, or a cell ID. For example, the terminal channel condition includes: a signal to interference plus noise ratio (SINR), or reference signal receiving power (RSRP).

In some examples of the disclosure, the second parameter includes: an aggregation degree of a physical downlink control channel (PDCCH), a transmission location of the PDCCH, or a DCI size of the PDCCH.

Figure 12:
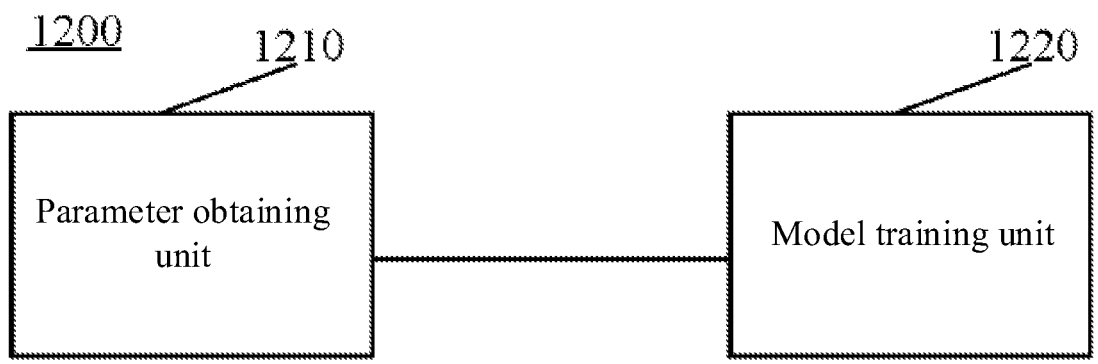
FIG. 12 is a block diagram of a channel parameter determination apparatus shown according to an example.

FIG. 12 is a block diagram of a channel parameter determination apparatus shown according to an example. Referring to FIG. 12, the channel parameter determination apparatus 1200 is performed by a terminal, including a parameter obtaining unit 1210 and a model training unit 1220.

The parameter obtaining unit 1210 is configured to obtain a first parameter.

The model training unit 1220 is configured to train at least one channel parameter model by using the first parameter.

In some examples of the disclosure, the model training unit 1220 is configured to output a second parameter of the channel in at least one time point; or output the second parameter of the channel in at least one time period.

In some examples of the disclosure, the parameter obtaining unit 1210 is configured to obtain the first parameter of the channel at the plurality of time periods within a day.

Figure 13:
FIG. 13 is a block diagram of a channel parameter determination apparatus shown according to an example.

FIG. 13 is a block diagram of a channel parameter determination apparatus shown according to an example. Referring to FIG. 13, the channel parameter determination apparatus 1300 is performed by a terminal, including a parameter obtaining unit 1310 and a model updating unit 1320.

The parameter obtaining unit 1310 is configured to obtain a first parameter.

The model updating unit 1320 is configured to update at least one channel parameter model according to the first parameter of a channel.

It may be understood that, in order to implement the above functions, the channel parameter determination apparatus provided by the example of the disclosure contains corresponding hardware structures and/or software modules for executing all the functions. Combined with units and algorithm steps of each example disclosed in the example of the disclosure, the example of the disclosure can be implemented in the form of hardware or a combination of hardware and computer software. Whether a certain function is executed in a mode of hardware or a mode of the hardware driven by the computer software depends on a specific application and design constraint conditions of the technical solution. Those skilled in the art may use different methods to implement the described functions for each specific application, but such implementation should not be regarded beyond the scope of the technical solution of the example of the disclosure.

Figure 14:
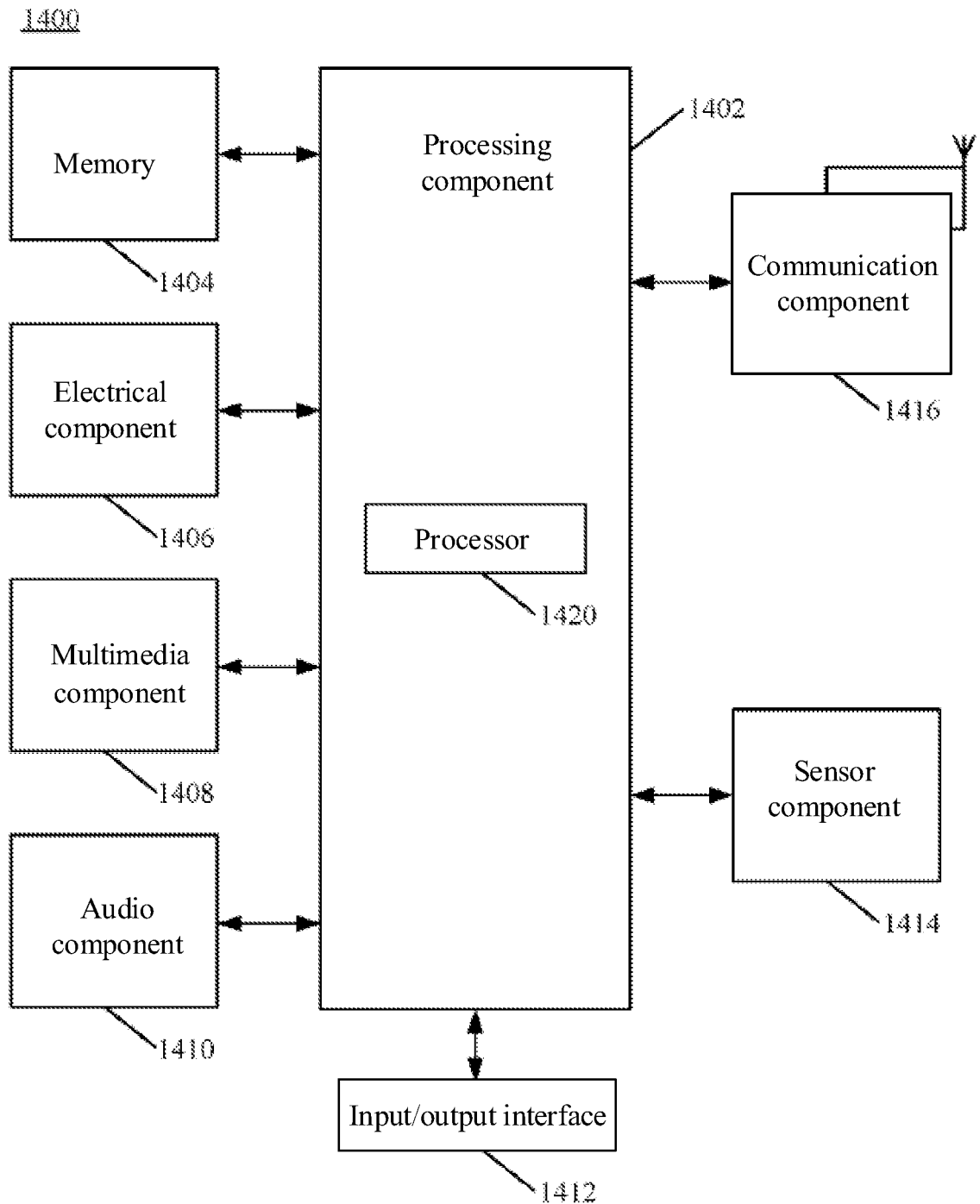
FIG. 14 is a block diagram of an apparatus for channel parameter determination shown according to an example.

FIG. 14 is a block diagram of an apparatus 1400 for channel parameter determination shown according to an example. For example, the apparatus 1400 may be a terminal. The terminal may be a mobile telephone, a computer, a digital broadcast terminal, a message transceiving device, a game console, a tablet device, a medical device, a fitness device, a personal digital assistant, and the like.

Referring to FIG. 14, the apparatus 1400 may include one or more of the following components: a processing component 1402, a memory 1404, an electrical component 1406, a multimedia component 1408, an audio component 1410, an input/output (I/O) interface 1412, a sensor component 1414, and a communication component 1416.

The processing component 1402 usually controls an overall operation of the apparatus 1400, such as operations associated with displaying, telephone calling, data communication, a camera operation, and a record operation. The processing component 1402 may include one or more processors 1420 to execute an instruction, so as to complete all or part of steps of the above method. In addition, the processing component 1402 may include one or more modules, so as to facilitate interaction between the processing component 1402 and other components. For example, the processing component 1402 may include a multimedia module, so as to facilitate interaction between the multimedia component 1408 and the processing component 1402.

The memory 1404 is configured to store various types of data so as to support operations on the apparatus 1400. Examples of these data include instructions of any application program or method used to be operated on the apparatus 1400, contact data, telephone directory data, messages, pictures, videos, and the like. The memory 1404 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 1406 provides electric power for various components of the apparatus 1400. The electrical component 1406 may include a power management system, one or more power sources, and other components associated with generating, managing and distributing electric power for the apparatus 1400.

The multimedia component 1408 includes a screen providing an output interface between the apparatus 1400 and a user. In some examples, the screen may include a liquid crystal display (LCD) and a touch panel (TP). In response to determining that the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 1408 includes a front camera and/or a back camera. In response to determining that the apparatus 1400 is in an operation mode, such as a shooting mode or a video mode, the front camera and/or the back camera may receive external multimedia data. Each front camera and each back camera may be a fixed optical lens system or have a focal length and optical zooming capability.

The audio component 1410 is configured to output and/or input an audio signal. For example, the audio component 1410 includes a microphone (MIC). In response to determining that the apparatus 1400 is in an operation mode, such as a call mode, a recording mode or a speech recognition mode, the microphone is configured to receive an external audio signal. The received audio signal may be further stored in the memory 1404 or sent via the communication component 1416. In some examples, the audio component 1410 further includes a speaker for outputting the audio signal.

The I/O interface 1412 provides an interface between the processing component 1402 and a peripheral interface module, and the above peripheral interface module may be a keyboard, a click wheel, buttons, etc. These buttons may include but are not limited to: a home button, a volume button, a start button and a lock button.

The sensor component 1414 includes one or more sensors for providing state evaluations of all aspects for the apparatus 1400. For example, the sensor component 1414 may detect a turn-on/turn-off state of the apparatus 1400 and relative positioning of components, for example, the components are a display and a keypad of the apparatus 1400. The sensor component 1414 may further detect position change of the apparatus 1400 or one component of the apparatus 1400, whether there is contact between the user and the apparatus 1400, azimuth or acceleration/deceleration of the apparatus 1400, and temperature change of the apparatus 1400. The sensor component 1414 may include a proximity sensor, which is configured to detect existence of a nearby object without any physical contact. The sensor component 1414 may further include an optical sensor, such as a CMOS or CCD image sensor, for use in an imaging application. In some examples, the sensor component 1414 may further include an acceleration sensor, a gyroscope sensor, a magnetic sensor, a pressure sensor or a temperature sensor.

The communication component 1416 is configured to facilitate wired or wireless communication between the apparatus 1400 and other devices. The apparatus 1400 may access a wireless network based on a communication standard, such as WiFi, 2G or 3G, or their combination. In one example, the communication component 1416 receives a broadcast signal or broadcast related information from an external broadcast management system via a broadcast channel. In one example, the communication component 1416 further includes a near-field communication (NFC) module so as to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In the example, the apparatus 1400 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In the example, a non-transitory computer readable storage medium including instructions is further provided, such as a memory 1404 including instructions. The above instructions may be executed by a processor 1420 of the apparatus 1400 so as to complete the above method. For example, the non-transitory computer readable storage medium may be an ROM, a random access memory (RAM), a CD-ROM, a magnetic tape, a floppy disk, an optical data storage device and the like.

Figure 15:
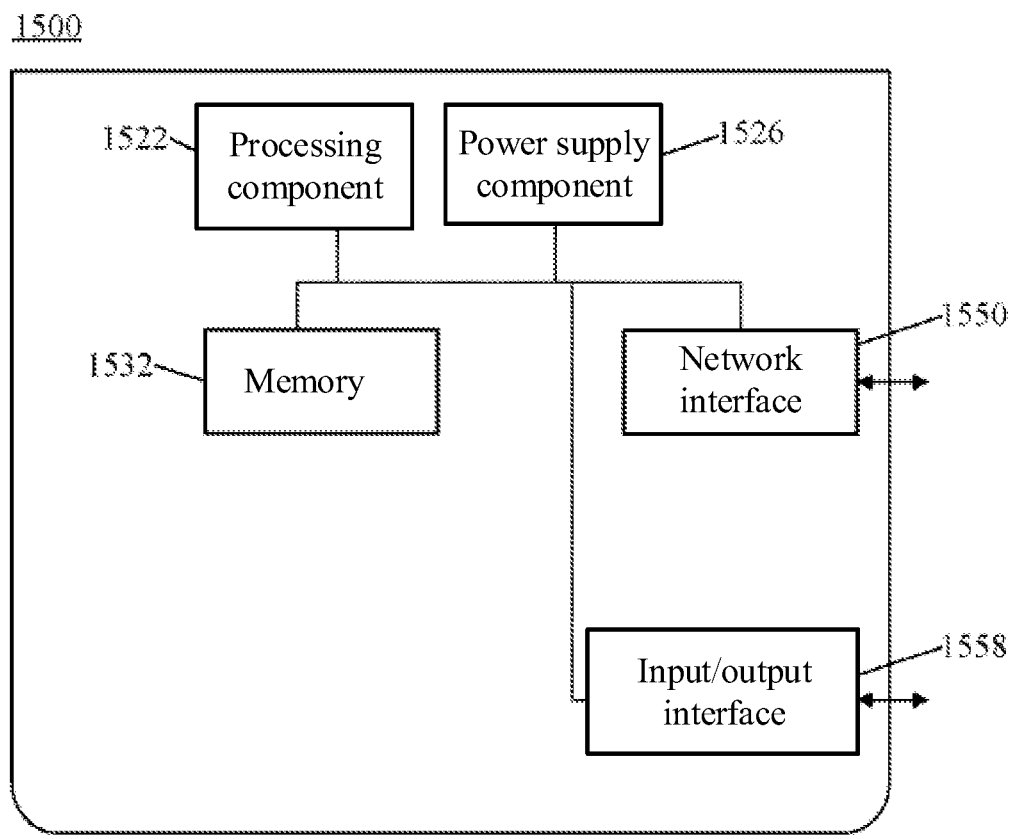
FIG. 15 is a block diagram of an apparatus for channel parameter determination shown according to an example.

FIG. 15 is a block diagram of an apparatus 1500 for channel parameter determination shown according to an example. The apparatus 1500 may be a network device. Referring to FIG. 15, the apparatus 1500 includes a processing component 1522, which further includes one or more processors, and a memory resource represented by a memory 1532, for storing instructions executable by the processing component 1522, such as an application program. The application program stored in the memory 1532 may include one or more modules with each corresponding to a set of instructions. In addition, the processing component 1522 is configured to execute the instructions to execute the above method.

The apparatus 1500 may further include: a power supply component 1526 configured to execute power management of the apparatus 1500, a wired or wireless network interface 1550 configured to connect the apparatus 1500 to a network, and an input/output (I/O) interface 1558. The apparatus 1500 may operate an operating system stored in a memory 1532, such as Windows Server™, Mac OS X™, Unix™, Linux™, FreeBSD™, or the like.

In the example, a non-transitory computer readable storage medium including instructions is further provided, such as a memory 1532 including instructions. The above instructions may be executed by the processing component 1522 of the apparatus 1500 so as to complete the above method. For example, the non-transitory computer readable storage medium may be an ROM, a random access memory (RAM), a CD-ROM, a magnetic tape, a floppy disk, an optical data storage device and the like.

It may be understood that in the disclosure, "plurality of" refers to two or more than two, and other quantifiers are similar. "And/or" describes an association relationship of an association object, and represents that there may be three kinds of relationships, for example, A and/or B, may represent: A exists alone, A and B exist at the same time, and B exists alone. A character "/" generally represents that the previous and next association objects are in an "or" relationship. The singular forms "a," "the," and "this" are intended to include the plural forms as well, unless the context clearly indicates otherwise.

It may be further understood that the terms "first," "second," and the like are used to describe various information, but this information should not be limited to these terms. These terms are configured to distinguish the same type of information from one another, and do not imply a particular order or a level of importance. In fact, the expressions "first," "second," and the like may be used completely interchangeably. For example, in a case of not departing from the scope of the disclosure, first information may also be called second information, and similarly, the second information may also be called the first information.

It may be further understood that although in the examples of the disclosure, the operations are described in a specific order in the accompanying drawings, it should not be construed as requiring that the operations are executed in the shown specific order or a serial order, or that all the shown operations are executed to obtain desired results. In a certain scenario, multitasking and parallel processing may be advantageous.

Those of skill in the art will easily figure out other implementation solutions of the disclosure after considering the specification and practicing the disclosure here. The disclosure intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are regarded as being for example, and the true scope and spirit of the disclosure are indicated by the following claims.

It should be understood that the disclosure is not limited to the exact structure that has been described above and shown in the accompanying drawings, and that various modifications and changes may be made without departing from the scope of the disclosure. The scope of the disclosure is limited by the appended claims.

What is claimed is:

1. A channel parameter determination method, performed by a network device, and comprising:
   obtaining a first parameter; and
   determining a second parameter of a channel by using at least one channel parameter model based on the first parameter; wherein the first parameter is an input of the channel parameter model during inference or during training, and the second parameter is an output of the channel parameter model during the inference or during the training;
   wherein the method further comprises:
   training the at least one channel parameter model by using the first parameter;
   wherein training the at least one channel parameter model comprises:
   outputting the second parameter of the channel in at least one time point; or outputting the second parameter of the channel in at least one time period.

2. The method according to claim 1, wherein the channel parameter model is a channel parameter model based on a regression algorithm.

3. The method according to claim 1, wherein the first parameter comprises at least one of:
   a service type, a service occurrence time, a terminal moving speed, a terminal channel condition, a terminal receiving capability, or a cell identity (ID), wherein the terminal channel condition comprises at least one of: a signal to interference plus noise ratio (SINR), or reference signal receiving power (RSRP);
   wherein the second parameter comprises at least one of:
   an aggregation degree of a physical downlink control channel (PDCCH), a transmission location of the PDCCH, or a downlink control information (DCI) size of the PDCCH.

4. The method according to claim 1, wherein obtaining the first parameter comprises:
   obtaining the first parameter of the channel at a plurality of time periods within a day.

5. The method according to claim 1, further comprising:
   updating the at least one channel parameter model according to the first parameter of the channel.

6. The method according to claim 1, further comprising:
   sending the at least one channel parameter model to a terminal.

7. The method according to claim 1, further comprising:
   sending first information, the first information being used to indicate the at least one channel parameter model; or
   sending second information, the second information being used to indicate activation of the at least one channel parameter model or to indicate deactivation of the at least one channel parameter model.

8. A non-transitory computer readable storage medium storing instructions, the instructions when executed by one or more processors, cause the one or more processors to perform the method according to claim 1.

9. A channel parameter determination method, performed by a terminal, and comprising:
   obtaining a first parameter; and
   determining a second parameter of a channel by using at least one channel parameter model based on the first parameter; wherein the first parameter is an input of the channel parameter model during inference or during training, and the second parameter is an output of the channel parameter model during the inference or during the training;
   wherein the method further comprises:
   training the at least one channel parameter model by using the first parameter;
   wherein training the at least one channel parameter model comprises:
   outputting the second parameter of the channel in at least one time point; or outputting the second parameter of the channel in at least one time period.

10. The method according to claim 9, wherein the channel parameter model is a channel parameter model based on a regression algorithm.

11. The method according to claim 9, wherein the first parameter comprises at least one of:
    a service type, a service occurrence time, a terminal moving speed, a terminal channel condition, a terminal receiving capability, or a cell identity (ID), wherein the terminal channel condition comprises at least one of: a signal to interference plus noise ratio (SINR), or reference signal receiving power (RSRP);
    wherein the second parameter comprises at least one of:
    an aggregation degree of a physical downlink control channel (PDCCH), a transmission location of the PDCCH, or a downlink control information (DCI) size of the PDCCH.

12. The method according to claim 9, further comprising:
    updating the at least one channel parameter model according to the first parameter of the channel.

13. The method according to claim 9, further comprising:
    receiving the at least one channel parameter model sent from a network device.

14. The method according to claim 13, further comprising:
    determining the one or more channel parameter models among the at least one channel parameter model according to a received signaling; or
    switching among a plurality of channel parameter models according to a trigger condition.

15. The method according to claim 9, further comprising:
    receiving first information, the first information being used to indicate the at least one channel parameter model; or
    sending second information, the second information being used to indicate activation of the at least one channel parameter model or to indicate deactivation of the at least one channel parameter model.

16. A channel parameter determination apparatus, performed by a terminal, and comprising:
    a memory for storing executable instructions; and
    one or more processors communicatively coupled to the memory, wherein the one or more processors are collectively configured to perform the method according to claim 9.

17. A non-transitory computer readable storage medium storing instructions, the instructions when executed by one or more processors, cause the one or more processors to perform the method according to claim 9.

18. A channel parameter determination apparatus, performed by a network device, and comprising:
    a memory for storing executable instructions; and
    one or more processors communicatively coupled to the memory,
    wherein the one or more processors are collectively configured to:
    obtain a first parameter; and
    determine a second parameter of a channel by using at least one channel parameter model based on the first parameter; wherein the first parameter is an input of the channel parameter model during inference or during training, and the second parameter is an output of the channel parameter model during the inference or during the training;

wherein the one or more processors are further collectively configured to:

train the at least one channel parameter model by using the first parameter;

wherein the one or more processors are further collectively configured to:

output the second parameter of the channel in at least one time point; or output the second parameter of the channel in at least one time period.

* * * * *